United States Patent [19]
Batts et al.

[11] Patent Number: 5,166,071
[45] Date of Patent: Nov. 24, 1992

[54] SEPARATION OF ELEMENTS DEFINING A FLUID FLOW PATH THROUGH THE USE OF PARTICLES

[75] Inventors: Gregory N. Batts, Bushey; Michael J. Gallagher, Northwood; Trevor J. Wear, Harrow, all of England

[73] Assignee: Eastman Kodak Company, Rochester, N.Y.

[21] Appl. No.: 358,737

[22] Filed: May 30, 1989

[30] Foreign Application Priority Data

Jul. 6, 1988 [GB] United Kingdom ............... 8816111

[51] Int. Cl.$^5$ .................. C12M 1/00; C12M 1/24; C12M 1/40; B01L 3/00
[52] U.S. Cl. .................... 435/288; 435/287; 435/296; 422/99; 436/541
[58] Field of Search .............. 435/288, 287, 310, 814, 435/284, 285, 286, 296; 210/632, 497.01; 436/541; 422/99

[56] References Cited

U.S. PATENT DOCUMENTS

| | | |
|---|---|---|
| 3,809,613 | 5/1974 | Vieth et al. |
| 3,941,661 | 3/1976 | Noteboom ............ 435/310 |
| 3,983,001 | 9/1976 | Coupek et al. ........ 435/213 |
| 4,264,449 | 4/1981 | Dodd .................. 210/656 |
| 4,273,865 | 6/1981 | von Stetten et al. ... 435/7.4 |
| 4,551,435 | 11/1985 | Liberti et al. ....... 436/541 |
| 4,880,749 | 11/1989 | Burdick et al. ....... 422/57 |
| 4,950,455 | 8/1990 | Smith ................. 422/56 |

Primary Examiner—James C. Housel
Assistant Examiner—William Chan
Attorney, Agent, or Firm—John R. Everett

[57] ABSTRACT

An element having a spacer for uniformly separating adjacent surfaces of elements defining a fluid flow path therebetween. The spacer comprises particles adhered to at least one of the surfaces. The invention is particularly useful in elements and apparatus for the removal of a substance from a fluid.

23 Claims, 2 Drawing Sheets

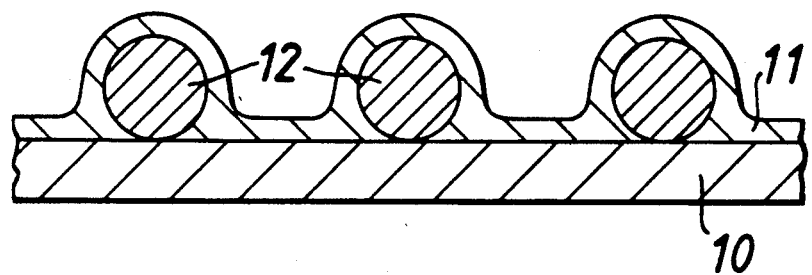
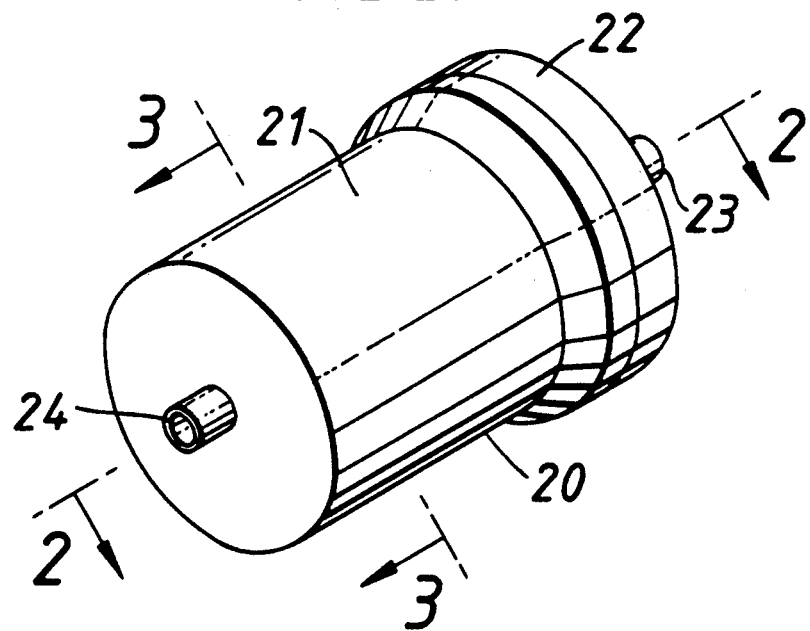

SEPARATION OF ELEMENTS DEFINING A FLUID FLOW PATH THROUGH THE USE OF PARTICLES

FIELD OF THE INVENTION

The invention relates to methods, elements and apparatus for defining a fluid flow path.

Many situations arise in which a fluid needs to be brought into contact with a surface e.g. for the removal of a substance in the fluid. The removal of the substance may occur by chemical or physical interaction between the substance and the surface. In order to ensure efficient interaction between the substance and the surface, it is frequently desirable to flow the fluid through a flow path having little depth over the surface so that the substance is brought into intimate contact with the surface. It is also usually desirable to maintain a high flow rate.

Examples of such situations include the purification of gases or the treatment of aqueous solutions to remove suspended or dissolved substances. An area of particular interest is the treatment of biological fluids.

U.S. Pat. No. 3,809,613 describes a biocatalytic module comprising an immobilized enzyme-membrane complex. In a preferred embodiment, a layer of an enzyme-collagen complex layer is coated on a cellulose acetate sheet support. In the module, the sheet is wound spirally on a central rod and the overlapping spiral layers are separated by a plurality of spacer rods arranged parallel to the central rod. The separation distance between adjacent surfaces of the sheet is typically 3 mm.

A disadvantage of the use of spacer rods is that it is difficult to achieve much smaller separation distances. Further, uneven separation may occur between the rods. Also, the rods define a plurality of distinct, unobstructed, parallel flow paths through the module in which relatively little fluid mixing occurs.

U.S. Pat. No. 4,551,435 describes a system for removing immune complexes from biological fluids e.g. blood. A non-immunospecific adsorbent e.g. Clq is adhered to a support sheet e.g. a polystyrene sheet. The sheet may be wound helically on a hollow cylindrical perforated core. The adjacent surfaces of the wound sheet are separated by spacer means comprising a strip of material adhered along each edge of the sheet. For example, the spacer means may comprise a polytetrafluoroethylene tape having a thickness of 1 mm.

A disadvantage associated with this means of separating the surfaces is that the major area of the adjacent surfaces is unsupported which results in uneven separation, especially if fluid is passed through the apparatus under pressure. Also, it is difficult to provide much smaller separation distances.

SUMMARY OF THE INVENTION

The invention aims to overcome the disadvantages mentioned above.

In one aspect, the invention provides a method of uniformly separating adjacent surfaces of an element or elements defining a fluid flow path which method comprises providing spacer means between the surfaces characterized in that the spacer means comprises particles adhered to at least one of the surfaces.

In another aspect, the invention provides an element for use in defining a fluid flow path having spacer means attached to a surface thereof, said spacer means being capable of providing uniform separation between the surface of the element and the surface of an adjacent element, characterized in that the spacer means comprises particles adhered to the surface of the element.

The invention also provides an apparatus comprising an element or elements defining a fluid flow path between adjacent surfaces thereof wherein the adjacent surfaces are uniformly separated by spacer means characterized in that the element is an element according to the invention.

Advantages offered by the invention include the possibility of achieving very small distances of separation. Uniform separation can be obtained and good support between adjacent surfaces is provided. Also, good fluid mixing can be obtained.

The invention is illustrated, by way of example, in the accompanying schematic drawings wherein:

BRIEF DESCRIPTION OF THE DRAWINGS

FIG. 1 is a cross sectional view of a preferred element of the invention;

FIG. 2 is a perspective view of the exterior of an apparatus incorporating the invention;

DETAILED DESCRIPTION OF THE INVENTION

Figure 3:
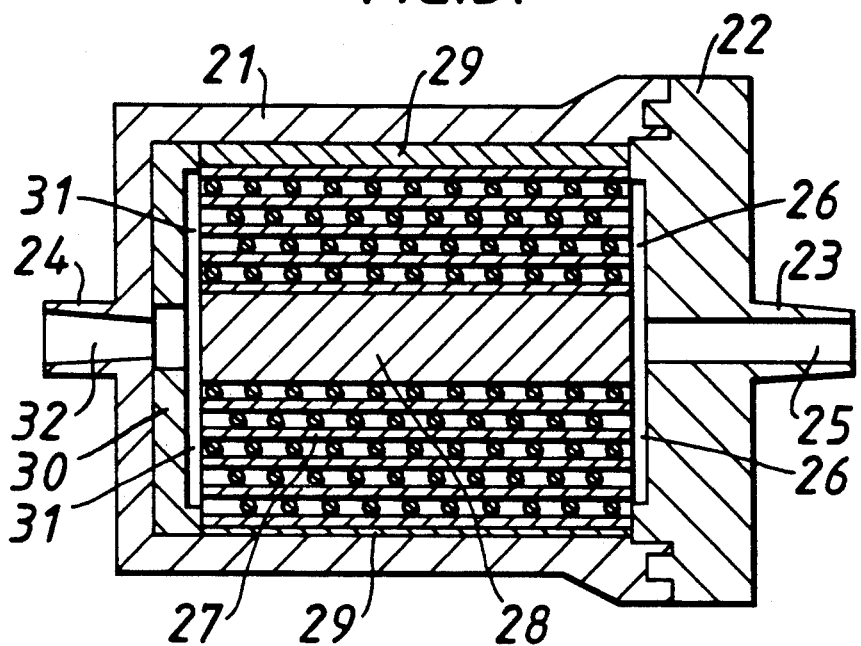
FIG. 3 is a longitudinal sectional view taken along line 2—2 of FIG. 2.

The element or elements defining the fluid flow path may take a variety of forms. For example, the flow path may be defined by the surfaces of adjacent plates or sheets. Alternatively, an element may be the wall of a container through which fluid is passed.

In a preferred embodiment of the invention, the element is in the form of a sheet. Preferably, the sheet is flat and, for certain applications, a flexible sheet may be preferred. For example, a flexible sheet may be wound into a coil in which the adjacent surfaces of the convolutions provide a fluid flow path.

Suitable sheet materials include polymers e.g. polyesters, metal and glass. Sheet thickness will vary depending on the material and the intended use. For example, for compactness, a sheet thickness from 0.05 to 0.5 mm may be desirable.

It may be particularly desirable for the particles to be present on only one surface of the element e.g. on one surface of a sheet, as shown in FIG. 1.

The particles used as spacer means may take a variety of shapes. Any shape is suitable provided that the separation between the surface of an element to which the particles are adhered and the surface of an adjacent element is uniform. Thus, by appropriate choice of particle size, the elements may be separated by a small pre-determined distance. It is generally desirable for the particles to have the same shape and dimension. Monodisperse particles may be particularly suitable. Preferably, the particles are present as a single layer as shown in FIG. 1.

Particles having a substantially spherical configuration are preferred. Such particles may advantageously be very small. For example, particles having a diameter from 20 to 500 $\mu$m may be used.

The particles may be composed of any suitable material. For example, they may be composed of a synthetic polymer or glass.

The density of the particles adhered to the surface is such that the required uniform separation is achieved while maintaining an adequate flow path. Preferably, the majority of the particles do not touch adjacent particles. Preferably, the particles are uniformly distributed over the surface to which they are adhered.

A particular advantage of the invention is that the spacer means i.e. the particles may be coated on the surface of the element from a coating solution containing the particles. In this way, particle density over the surface can be easily controlled. Further, the coating solution may comprise the means by which the particles are adhered to the surface. For example, the coating solution may comprise an adhesive or a polymer solution.

In a preferred embodiment of the invention, the particles are adhered to the surface by means of a polymer layer extending over the surface. In addition to adhering the particles to the surface, the polymer may be chosen to provide the surface with desired properties.

In a particular application, the invention is employed in elements and apparatus for the selective removal of a chemical species from a fluid.

Chemical species in a fluid e.g. a liquid solution or suspension, may be selectively removed and thereby separated from other species by contacting the fluid with a solid material having sites capable of selectively interacting with the species to be removed. Various forms of interaction are possible. For example, the interaction may be predominantly chemical such as ion exchange or chelation, or it may be of a biochemical nature such as the formation of affinity complexes between biochemical molecules, cells or other particulates. If the interaction is reversible, the species which has interacted specifically can be recovered.

The site on the solid material at which interaction occurs may comprise an atom, a group of atoms or a molecule, commonly referred to as a ligand, which is attached to the material and is capable of selectively interacting with the species to be removed.

In biospecific affinity reactions, the ligand may be an immunochemical component e.g. a protein which exhibits biospecific affinity for another immunochemical component. An important class of such reactions is that between an antigen (or hapten) and an antibody directed against it. The use of monoclonal antibodies allows highly specific affinity reactions to be carried out.

Examples of antigens, commonly referred to as foreign substances, include viruses, bacteria, bacterial toxins, carbohydrates, hormones, drugs and lectins.

In addition, other reactions between biologically active compounds, such as enzymes and their substrates, are often sufficiently specific and have sufficient affinity to be employed for separations. In addition, small molecules such as amino acids may interact specifically and with sufficient affinity with, for example, proteins to enable separation to be achieved.

In a preferred embodiment of the invention the element or elements defining the fluid flow path is covered with a material for use in the selective removal of a chemical species from a fluid.

The particles may be adhered to the surface of the element by means of a polymer layer extending over the surface of the element including, preferably, the surface of the particles. Advantageously, the polymer layer is capable of immobilizing a ligand for a chemical species to be removed from a fluid and has at its surface functional groups which are directly or indirectly reactive with the ligand.

In one preferred embodiment, the element comprises a support sheet having adhered thereto a layer of such a polymer. Preferably, the element is impervious.

The polymer layer may be present as an activated polymer layer i.e. containing functional groups which will react directly with the ligand. Alternatively, it may be present as an un-activated or activatable polymer layer which is subsequently activated by treatment with an activating agent. The activating agent may convert a functional group of the activatable polymer into a functional group capable of reaction with the ligand or it may be a coupling agent which becomes attached to the polymer by reaction with a functional group of the activatable polymer.

Examples of activating agents include divinyl sulphone, cyanogen bromide and glutaraldehyde.

Suitable polymers may be derived from monomers such as ethylenically unsaturated hydroxy group-containing monomers e.g. hydroxyethyl methacrylate (HEMA), ethylenically unsaturated oxirane group-containing monomers e.g. glycidyl acrylate and ethylenically unsaturated amide group-containing monomers e.g. acrylamide.

In order to achieve the selective removal of a chemical species from a fluid e.g. the removal of a specific protein from a mixture thereof, the polymer must be such that non-specific adsorption on the element is minimal.

Preferably, the activated or activatable polymer is substantially hydrophilic. Particularly suitable chemical groups which confer hydrophilicity on the polymer include hydroxyl, amino, carboxyl and thiol groups.

In order to minimize the problems associated with the use of porous materials, the activated or activatable polymer layer may be substantially non-porous. If the activated or activatable polymer layer is porous, it is preferred that the pores are sufficiently small to exclude the entry into the layer of the ligand or the species to be removed e.g. a protein. Preferably, the activated polymer layer is substantially non-swellable.

For ease of manufacture, it is preferred that the activatable or activated polymer is solvent-coatable e.g. coatable from solution in water and/or an organic solvent. In this way, conventional coating machinery including, for example, slide hoppers or extrusion hoppers, can be used to produce efficiently large quantities of coated product.

Preferably, the activatable or activated polymer layer constitutes a continuous layer over the support.

A variety of factors may affect the choice of thickness of the activated polymer layer. Since, in a preferred embodiment, the interaction between the ligand and the species to be removed takes place predominantly at the surface of the layer, it need only be sufficiently thick to provide adequate attachment of the ligand to the support sheet. By way of example, the dry thickness of the activated polymer layer may be from 5 to 100 $\mu$m., more preferably from 10 to 50 $\mu$m.

Adequate adhesion between the activated polymer layer and the support sheet may be obtained by appropriate selection of the two materials involved. Alternatively, adhesion may be promoted by other means such as the use of a subbing layer or by subjecting the support sheet to a corona discharge or RF plasma treatment before applying the polymer layer.

In one preferred embodiment of the invention, a layer of activated polymer is provided on each side of the support sheet.

Generally, before an element of the invention can be used for removing a chemical species from a fluid e.g. an aqueous solution or suspension, a ligand for the species is covalently attached to the activated polymer layer of the element. When the polymer layer is substantially non-porous, the ligand will be attached predominantly on the surface of the layer.

The method for removing a chemical species from a fluid may be carried out in the apparatus of the invention.

Preferably, the apparatus comprises a housing defining a chamber, the housing having fluid inlet and fluid outlet means, the chamber containing the element or elements defining a fluid flow path, said element or elements being positioned between the inlet and the outlet such that, when the apparatus is in use, fluid entering the chamber through the inlet is passed through the fluid flow path before leaving the chamber through the outlet.

The element or elements of the invention contained by the apparatus may be configured in a number of different ways.

For example, the elements may comprise a plurality of sheets in face to face configuration, each sheet being separated from adjacent sheets by the spacer means.

In a preferred embodiment of the apparatus, the element is in the form of a coil wherein the convolutions of the coil are separated by spacer means and the defined flow path is axial relative to the axis of the coil.

In another preferred embodiment, the element is in the form of a coil wherein the convolutions of the coil are separated by spacer means and the defined flow path is circumferential through the convolutions.

Preferably, the spacer means provides a substantially constant separation distance between adjacent surfaces of the element or elements. The separation distance may be from 20 to 500 $\mu$m, preferably from 30 to 200 $\mu$m.

The element or apparatus may be used to remove a biologically active molecule from a mixture thereof by utilizing a biospecific affinity reaction. In this instance, the ligand may be a biospecific ligand e.g. a protein, and the activated polymer will comprise suitable functional groups through which the protein can be covalently bonded to the polymer. Such groups are well-known and include hydroxyl, amine and thiol groups. An example of a protein ligand is protein A.

Many biospecific affinity reactions are known and a particular example is that represented by the reaction of an antigen and an antibody raised against it. With the wide range of monoclonal antibodies available, it is now possible to perform a wide range of highly specific affinity reactions. A particular anti body ligand which has been used in the invention is a rat anti-mouse kappa-chain antibody.

Other ligands which may be used include reactive dyes such as triazine dyes e.g. Procion MX-R and Cibacron Blue F3G-A.

Advantages associated with the use of the apparatus of the invention include the fact that it is capable of handling fluids containing particulate materials e.g. cells and hence is very much less prone to blockage by such particulate material compared to available apparatus. Further, the apparatus is self-contained, and convenient to use and dispose of which makes it suitable for once only use if desired. This is an important consideration when handling materials containing substances such as pathogens, viruses or DNA products, or when the treated fluid is to be re-injected into a patient (e.g. bone marrow purging). Additionally, the apparatus is readily pre-packaged and, if desired, pre-sterilized.

It will be appreciated that the apparatus could be supplied in different forms having regard to the nature of the element contained therein. For example, the polymer layer could be in activatable form so that, before use, it would require treatment with an activating agent and subsequent treatment for binding the ligand. Alternatively, the polymer layer could already be activated and simply require treatment for binding the ligand. Finally, the apparatus could be supplied with ligand attached to the element.

The element and apparatus of the invention are further described with reference to and as illustrated in FIGS. 1 to 4 (not to scale).

FIG. 1 shows a cross-sectional view of an element of the invention. The element comprises a support sheet 10 coated with a layer of an activatable or activated polymer 11. Spacer beads 12 incorporated in the layer 11 adhere to the support 10.

FIG. 2 is a perspective view of the exterior of an apparatus of the invention. The housing 20 is shown which may be moulded from a plastics material e.g. polypropylene. The housing 20 comprises a cylindrical body portion 21 to which is attached a lid 22. The lid is provided with fluid inlet tube 23 and the body portion is provided with a fluid outlet tube 24.

Figure 4:
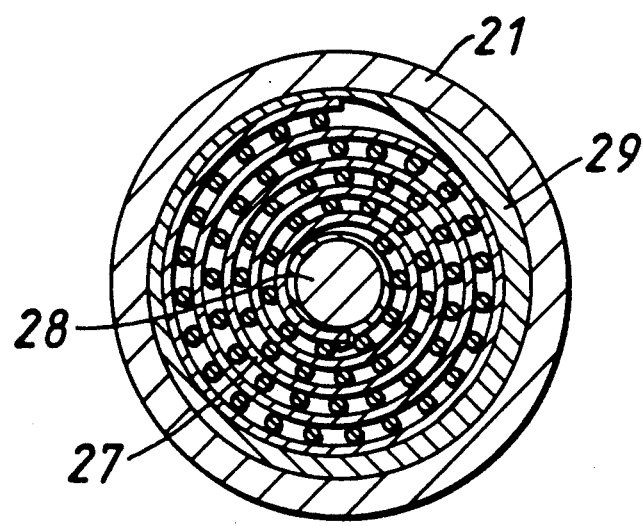
FIG. 4 is a transverse sectional view taken along lines 3—3 of FIG. 2.

FIGS. 3 and 4 are sectional views taken along lines 2—2 and 3—3, respectively, of FIG. 2.

The lid 22 contains an axial passageway 25 through which fluid may be passed into the chamber defined by the housing 20. The inner surface of the lid 22 is provided with grooves 26 extending radially from the passageway 25 to spread the flow of fluid as it enters the chamber. The chamber contains a coil 27 of an element of the invention. An element of the type shown in FIG. 1 is helically wound on a cylindrical core 28. The outer winding of the coil is attached to the body of the coil by an adhesive tape 29 which is co-extensive with the outer surface of the coil and provides a fluid-tight seal between the coil and the inner surface of the housing 20.

The coil fills the chamber between the lid 22 at one end and a polypropylene disc 30 held against the circular wall of the chamber at the other end. The surface of the disc facing the coil is provided with grooves 31 extending radially from a central passageway running axially through the disc. This passageway communicates with the passageway 32 passing through the end wall of the housing and outlet tube 24.

When the apparatus is in use, fluid entering the chamber through the inlet passes axially through the convolutions of the coil before leaving the chamber through the outlet.

It is emphasized that the drawings and, in particular, the representation of the coil are schematic. In practice, the overall thickness of the element may be of the order of 200 $\mu$m. A coil has been produced from such an element in the form of a strip 35 mm wide and 11 m long helically wound on a central cylindrical core having a diameter of approximately 12 mm. Such a coil has been contained in an apparatus of the type shown having an overall length of 80 mm and an external diameter of 70 mm. Clearly, the coil consists of many closely-spaced convolutions which it would be impossible to show adequately in a scale drawing.

The invention is further described by way of example as follows.

EXAMPLE 1

A coating solution was prepared containing 10% w/w poly-hydroxyethyl methacrylate (HEMA) in ethanol and glutaraldehyde cross-linking agent in an amount of 5% w/w polymer.

An extrusion hopper was used to coat the solution onto one side of a corona-discharge treated polyethylene terephthalate sheet having a thickness of 0.08 mm. The flowrate of the solution was adjusted to give a wet laydown of 100 μm at a coating speed of 3 m/min. The coating was dried at room temperature in the coating machine for about 20 minutes and cured at 90° C. for about 2 days.

The coating operation was also carried out on the other side of the sheet with the modification that the solution contained silica-coated polystyrene spacer beads having a diameter of 50 μm to give a density of about 200 beads/sq.cm in the dried product.

The dry thickness of the cross-linked polymer layer was 10-20 μm and it had minimal swelling in water.

The sheet so produced was slit into 11 m lengths each 35 mm wide.

Such a strip was spooled under clean conditions onto a central core and the coiled element inserted into an apparatus similar to that shown in FIGS. 2-4.

The apparatus was weighed dry and then flushed with "Millipore" quality water for several hours to remove any residual cross-linking agent and then reweighed. The difference in mass indicated that the fill volume of the apparatus was about 27 ml (i.e. the volume of liquid which the dry apparatus will hold).

Procion-Blue MXR dye was then coupled to the polymer layer by circulating through the apparatus 100 ml of a solution containing 1 g dye, 30 ml 4M NaCl, 0.2 ml 10M NaOH, at 40° C. for 2 hours at a flowrate of 10 ml/min. The apparatus was then flushed with water for 2 hours. It was then flushed with 600 ml 0.2M Phosphate/1M NaCl solution, then with water again and finally with 0.14M PBS.

Albumin was then separated from rabbit serum by circulating 50 ml freshly defrosted serum at 20 ml/min through the apparatus for 2 hours, occasionally stopping the flow to allow good contact between the serum and the polymer layer.

The apparatus was then flushed with PBS until the washings had zero UV absorbance at 280 nm.

60 ml of 0.005M Tris/HCl/0.2M NaSCN was passed through the apparatus at 10 ml/min to elute 6 mg albumin and a further 20 ml was circulated through the apparatus at 10 ml/min for ½ hour to elute a further 6 mg albumin.

Protein recovery was determined by optical absorption at 280 nm and electrophoresis was used to identify the recovered albumin.

EXAMPLE 2

1. Synthesis of poly(2-hydroxyethyl methacrylate-comethyl-methacrylate-co-methacrylic acid-co3-chloro-2-hydroxypropyl methacrylate (16:1:1:2)

A one litre, 3-necked round bottom flask, fitted with a condenser and nitrogen inlet, was charged with the following:

| | |
|---|---|
| 2-hydroxyethyl methacrylate (0.48 moles) | 62.45 g |
| methyl methacrylate (0.03 moles) | 3.00 g |
| methacrylic acid (0.03 moles) | 2.55 g |
| 3-chloro-2-hydroxypropyl methacrylate (0.06 moles) | 10.72 g |
| p-toluenesulphonic acid monohydrate | 2.10 g |
| bis (4-tert.butylcyclohexyl)-peroxydicarbonate | 0.79 g |
| ethanol/methyl cellosolve (9:1 v/v) | 250 ml |

The solution was stirred at 50° C. for 17 hours. Nitrogen was bubbled through the solution throughout this period. The polymer was recovered by precipitation into an excess of diethyl ether and dried in a desiccator. (Yield=74.9 g).

2. Coating the Polymer

A coating solution was prepared consisting of 10% w/w of the above polymer in 100% dimethylformamide plus 10% w/w tetrabutyl ammonium hydroxide/polymer. 50 μm silica-coated styrene beads were incorporated in suspension in the solution as spacer beads.

The solution was coated on one side of a corona discharge treated polyethylene terephthalate sheet to provide a wet laydown thickness of 100 μm. The coating was dried at 90° C. for about 20 minutes. The quantity of spacer beads in the dried product was about 200 beads/sq.cm. The dry thickness of the crosslinked polymer layer was 10 to 20 μm. The other side of the sheet was similarly coated except that the coating solution did not contain the spacer beads.

The coating was stable in water, salt solutions, ethanol, acetone and dimethylformamide demonstrating that effective cross-linking had taken place.

The coated sheet was slit into strips approximately 15 m long and 35 mm wide. A strip was spooled under clean conditions onto a central core and the coiled element was inserted into an apparatus similar to that shown in FIGS. 2-4 made of polypropylene. After inserting the coiled element into the body of the apparatus, the lid was attached by ultrasonic welding.

The apparatus was flushed with "Millipore" quality water.

3. Chromatographic Use

Cibacron Blue F3G-A dye was coupled to the coiled element in accordance with the following procedure. 2.4 g of dye dissolved in 65 ml water and 10 ml sodium chloride solution (4M) was pumped through the previously flushed apparatus at 60 ml/min for 30 mins. The apparatus was left standing for 90 mins at room temperature to allow the dye to adsorb to the polymer surface. 1.25 ml of sodium hydroxide solution (10M) was added to the dye solution which was circulated through the apparatus for 30 mins at a pH greater than 12. The inlet and outlet ports of the apparatus were sealed and it was stored in a shaker at 25° C. for two days.

Water was flushed through the apparatus at 60 ml/min until no dye was detected by spectral absorption at 280 nm. Any uncoupled dye was removed from the coating surface by flushing with sodium chloride (1M)/ethyl alcohol(25%) solution.

The apparatus was flushed with 200 ml 0.05M phosphate buffer solution (pH 7) at 50 ml/min. 50 ml untreated rabbit serum was loaded into the apparatus at 30 ml/min. The first 30 ml solution leaving the apparatus was discarded and the remaining solution was circulated through the apparatus for 30 mins at the same flowrate. The pump was then switched off and the apparatus was left standing for a further 30 mins. 0.05M phosphate buffer solution was flushed through the apparatus at 60 ml/min until UV absorption at 280 nm of the washings was zero.

Elution was carried out with a chosen solution at 30 ml/min and the first six fractions collected. The solution was circulated at 30 ml/min for 10 mins and a seventh fraction was collected. The flowrate was increased to 60 ml/min and a further 2×20 ml fractions were collected.

Using 0.2M NaSCN/0.05M Tris/HCl (pH 8) as the eluent for a number of runs yielded 3-11 mg albumin.

Protein recovery was determined by optical absorption at 280 nm and electrophoresis was used to identify the recovered protein.

Albumin recovery has also been demonstrated using Procion MX-R dye instead of Cibacron F3G-A following the procedure of this Example.

EXAMPLE 3

A polymer-coated polyethylene terephthalate sheet was prepared as described in parts 1 and 2 of Example 2 except that 100 $\mu$m silica-coated styrene beads were used instead of the 50 $\mu$m size beads.

Samples of the coated polymer were activated by treatment with a 4% divinylsulphone solution in 0.5M sodium bicarbonate, pH 11. Rat anti-mouse K-chain monoclonal antibody at 0.8 mg/ml was coupled to the activated polymer coatings in 0.1M sodium bicarbonate, 0.5M sodium chloride solution at pH 8. The rat anti-mouse K-chain antibody was purified from ascites fluid obtained from Sera-lab (clone OX-20, code MAS 202C).

Jurkat cells, a human T-cell leukaemia (J. Experimental Medicine 152: 1709, 1980; Gillis, S., and Watson, J) grown in RPMI 1640 medium supplemented with 5% foetal calf serum (both from Flow Laboratories) were washed free of medium and resuspended in phosphate-buffered saline. (PBS composition: 0.15M NaCl, 2.7 mM KCl, 8 mM $Na_2HPO_4$, 1.5 mM $KH_2PO_4$, pH 7.2). The viability of the cells was greater than 85% as judged by trypan blue exclusion.

A total of $3.1 \times 10^7$ Jurkat cells ($5.2 \times 10^6$ cells/ml) were labelled with a mouse monoclonal antibody against the T cell surface antigen CD2. The antibody was obtained from Becton Dickinson Ltd., (Anti-Leu-5b, catalog No. 7590). The antibody was added to the cells in the proportion 0.5 $\mu$g antibody/$10^7$ cells. Cells and antibody were incubated together, after which excess antibody was removed by centrifugation and the labelled cells resuspended in PBS.

The polymer coatings to which OX-20 was coupled were incubated with the suspension of the labelled cells. The coatings were subsequently washed with PBS and examined microscopically. The coatings showed a good even coverage of bound cells at high density.

For comparison, samples of the coating were incubated with non-antibody labelled cells. Subsequent microscopic examination revealed that virtually no cells had become bound to the polymer.

The invention has been described in detail with particular reference to preferred embodiments thereof, but it will be understood that variations and modifications can be effected within the spirit and scope of the invention.

We claim:

1. An element having spacer means attached to a surface thereon, said spacer means being capable of providing uniform separation between the surface of the element and the surface of an adjacent element, wherein the spacer means comprise particles adhered to the surface of the element and the surface of the element is covered with a material for use in the selective removal of a chemical species from a liquid.

2. An element according to claim 1 wherein the element is in the form of a sheet.

3. An element according to claim 2 or 1 wherein the sheet has a thickness from 0.05 to 0.5 mm.

4. An element according to claim 2 or 1 wherein the particles are substantially spherical.

5. An element according to claim 4 wherein the diameter of the particles is in the range from 20 to 500 $\mu$m.

6. An element according to claim 4 wherein the particles are beads of polymer or glass.

7. An element according to claim 1 wherein the particles are adhered to the surface of the element by means of a polymer layer extending over the surface.

8. An apparatus comprising a housing defining a chamber, the housing having fluid inlet and fluid outlet means, the chamber containing an element or elements defining a fluid flow path between adjacent surfaces thereof wherein the adjacent surfaces are uniformly separated by spacer means, said element or elements being positioned between the inlet and the outlet such that, when the apparatus is in use, fluid entering the chamber through the inlet is passed through the fluid flow, path before leaving the chamber through the outlet, wherein the spacer means comprises particles adhered to the surface of the element.

9. An apparatus according to claim 8 wherein the element is in the form of a sheet.

10. An apparatus according to claim 9 wherein the support sheet has a thickness from 0.05 to 0.5 mm.

11. An apparatus according to claim 8 wherein the particles are substantially spherical.

12. An apparatus according to claim 11 wherein the particles are polymer or glass.

13. An apparatus according to claim 8 wherein the diameter of the particles is in the range from 20 to 500 $\mu$m.

14. An apparatus according to any one of claims 8 to 13 wherein the surface of the element is covered with a material for use in the selective removal of a chemical species from a liquid.

15. An apparatus according to any one of claims 8, 11, 13 or 12 wherein the particles are adhered to the surface of the element by means of a polymer layer extending over the surface.

16. An apparatus according to claim 15, having a ligand covalently bonded to the polymer.

17. An apparatus according to claim 16 wherein the ligand is a biospecific ligand.

18. An apparatus according to claim 16 wherein the ligand is a protein or a reactive dye.

19. An apparatus according to claim 8 wherein the polymer layer is capable of immobilizing a ligand for a chemical species to be removed from a fluid and has at its surface functional groups which are directly or indirectly reactive with the ligand.

20. An apparatus according to claim 19 wherein the polymer layer is substantially non-porous.

21. An apparatus according to claim 19, wherein the polymer is derived from an ethylenically unsaturated monomer containing hydroxy groups.

22. An apparatus according to claim 21 wherein the polymer is crosslinked hydroxyethyl methacrylate.

23. An apparatus according to any one of claim 20, 21 or 22 wherein the thickness of the polymer layer is from 5 to 100 $\mu$m.

* * * * *